(12) United States Patent
Badding et al.

(10) Patent No.: US 7,687,090 B2
(45) Date of Patent: Mar. 30, 2010

(54) FUEL CELL DEVICE ASSEMBLY AND FRAME

(75) Inventors: Michael Edward Badding, Painted Post, NY (US); Jacqueline Leslie Brown, Lindley, NY (US); Scott Christopher Pollard, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 1081 days.

(21) Appl. No.: 11/000,670

(22) Filed: Nov. 30, 2004

(65) Prior Publication Data

US 2006/0115709 A1 Jun. 1, 2006

(51) Int. Cl.
*H01M 2/14* (2006.01)
(52) U.S. Cl. .............................. 426/39; 429/30; 429/34; 429/38
(58) Field of Classification Search .................. 429/30, 429/34, 35, 37, 38, 39
See application file for complete search history.

(56) References Cited

U.S. PATENT DOCUMENTS

| | | | |
|---|---|---|---|
| 4,403,018 A | 9/1983 | Alfenaar et al. | 429/34 |
| 4,696,870 A | 9/1987 | Sasaki et al. | 429/14 |
| 5,085,455 A | 2/1992 | Bogner et al. | 280/618 |
| 5,219,674 A | 6/1993 | Singelyn et al. | 429/36 |
| 5,273,837 A | 12/1993 | Aitken et al. | 429/30 |
| 5,416,057 A | 5/1995 | Lipp et al. | 502/439 |
| 5,486,428 A | 1/1996 | Gardner et al. | 429/19 |
| 6,303,245 B1 | 10/2001 | Nelson | 429/34 |
| 6,352,578 B1 | 3/2002 | Sakata et al. | 96/134 |
| 2001/0044041 A1 | 11/2001 | Badding et al. | 429/32 |
| 2001/0044043 A1 | 11/2001 | Badding et al. | 429/40 |
| 2002/0102450 A1 | 8/2002 | Badding et al. | 429/32 |
| 2003/0096147 A1* | 5/2003 | Badding et al. | 429/30 |
| 2004/0170883 A1 | 9/2004 | Bartholomeyzik et al. | 429/36 |
| 2004/0202918 A1 | 10/2004 | Mardilovich et al. | 429/40 |
| 2006/0090651 A1* | 5/2006 | Liu et al. | 96/121 |

FOREIGN PATENT DOCUMENTS

| | | |
|---|---|---|
| WO | 01/03224 | 1/2001 |
| WO | 01/78179 | 10/2001 |

OTHER PUBLICATIONS

"Electrochemical Properties of a SOFC Cathode in Contact with a Chromium-Containing Alloy Separator"; Solid State Ionics 132 (2000) 271-278 by Yoshio Matsuzaki and Isamu Yasuda.

* cited by examiner

*Primary Examiner*—Dah-Wei Yuan
*Assistant Examiner*—Ben Lewis
(74) *Attorney, Agent, or Firm*—Svetlana Z. Short (57) ABSTRACT

An exemplary fuel cell device assembly includes: (i) an electrolyte sheet; (ii) a plurality of cathodes disposed on one side of the electrolyte sheet; (iii) a plurality of anodes disposed on another side of the electrolyte sheet; and (iv) a frame supporting the electrolyte sheet, the frame having a plurality of channels. Preferably the cross-sectional area of the frame has channel density of at least $20/in^2$ and channel wall thickness of 50 mils or less.

21 Claims, 8 Drawing Sheets

FUEL CELL DEVICE ASSEMBLY AND FRAME

BACKGROUND OF THE INVENTION

1. Field of the Invention

The present invention relates generally to fuel cell devices, and particularly to frames for the fuel cell devices.

2. Technical Background

The use of solid oxide fuel cells has been the subject of considerable amount of research in recent years. The typical components of a solid oxide fuel cell (SOFC) comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

U.S. Patent Publication US2002/0102450 and 2001/0044041 describe solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in electrolyte sheet. The vias are filled with electronically conductive materials (via interconnects).

U.S. Pat. No. 5,085,455 discloses thin, smooth inorganic sintered sheets. The disclosed sintered sheets have strength and flexibility to permit bending without breaking as well as excellent stability over a wide range of temperatures. Some of the disclosed compositions, such as yttria stabilized zirconia YSZ ($Y_2O_3$—$ZrO_2$) would be useful as electrolytes for fuel cells. It is known that at sufficient temperatures (e.g., about 725° C. and above), zirconia electrolytes exhibit good ionic conductance and very low electronic conductance. U.S. Pat. No. 5,273,837 describes the use of such compositions to form thermal shock resistant solid oxide fuel cells.

U.S. Patent Publication US2001/0044043 describes solid electrolyte fuel cells utilizing substantially planar, smooth electrolyte sheet with a roughened interface surface layer. This publication discloses electrolyte sheet thickness below 45 micrometers. The ceramic electrolyte sheet is flexible at such thicknesses.

Furthermore, fuel cells endure thermal cycling and large thermal gradients, which induces thermal stresses in the electrolyte sheets. In addition, a mounted electrolyte sheet will expand at a rate that is different from the thermal expansion rate of its frame, which may cause cracking of the electrolyte sheet. A defect in an electrolyte sheet may necessitate a replacement of the entire cell or electrolyte device.

It is known that substrate type solid oxide fuel cells sometimes utilize metal alloys as separators. Such configuration is described, for example, in the article entitled "Electro-magnetic properties of a SOFC cathode in contact with a chromium-containing alloy separator", by Yoshido Matsuzaki and Isami Yasuda, Solid state Ionics 132 (2000) 271-278.

Solid oxide fuel cells may also be supported by a porous support structure, as disclosed for example in U.S. Pat. No. 5,486,428. Inside the porous support structure are sealed corrugated ceramic plates that form passages for either oxygen or fuel. More specifically, U.S. Pat. No. 5,486,428 discloses fuel cell modules, each having a porous substrate supporting a plurality of electrodes. An electrolyte layer is situated over these electrodes and another electrode layer is situated on the electrolyte layer. The porous support structure forms an integrated whole with these layers and is inseparable from these layers. The patent discloses that the fuel cell layers are directly bonded to the porous support structure, therefore fabrication constraints limit fuel cell configuration. For example, the cell layers are generally fired at different temperatures. Typically the anode and electrolyte are sintered at temperatures of 1400° C. or higher, whereas the cathode is ideally sintered at a temperature of 1200° C. or lower. Hence the fuel cell layers must be deposited in decreasing order of firing temperatures. However, it would be advantageous to be able to have other design configurations of the fuel cell arrays, without concern for the fabrication constraints. Furthermore, the porous support structure is relatively thick, and therefore, expensive to make. U.S. Pat. No. 6,194,095 discloses fuel cell stacks containing fuel cell arrays formed on an electrolyte impregnated porous plastic dielectric sheets with the cell to cell electrical interconnections made through the electrolyte membrane. The disclosed design utilizes air flow manifold units as well as fuel manifold units assembled between the fuel cell arrays. Having additional air and fuel manifold units and assembling them between the fuel cell arrays increases the complexity and the cost of the fuel cell stack.

U.S. Pat. No. 5,416,057 discloses a coated alternating heat exchanger device and a method of making such. The heat exchanger comprises a plurality of passages situated within a ceramic body. This patent does not disclose the use of this device in fuel cell applications.

SUMMARY OF THE INVENTION

One aspect of the invention is a fuel cell device assembly comprising: (i) an electrolyte sheet; (ii) a plurality of cathodes disposed on one side of the electrolyte sheet; (iii) a plurality of anodes disposed on another side of the electrolyte sheet; and (iv) a frame supporting the electrolyte sheet, the frame having a plurality of channels, such that a cross-sectional area of said frame has channel density of at least 10/in² and channel wall thickness of 50 mils or less. It is more preferable that the channel density be at least 20/in², more preferably at least 50/in², and most preferably at least 100/in². It is more preferable that the wall thickness be less than 30 mils, most preferably less than 20 mils.

In another aspect, the present invention includes a support for an electrolyte sheet, the support comprising: a frame having (i) a plurality of channels therein, such that a cross-sectional area of said frame has channel density of at least 20/in² and channel wall thickness of 50 mils or less.

According to some embodiments of the present invention the frame is ceramic and is attached to the electrolyte sheet by a glass frit seal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts. One embodiment of the fuel cell device includes: (i) at least one electrolyte sheet; (ii) a plurality of cathodes disposed on one side of the electrolyte sheet; (iii) a plurality of anodes disposed on another side of the electrolyte sheet; and (iv) a frame supporting the electrolyte sheet, the frame having a plurality of parallel channels. The channels may be utilized to provide the required reactant to the anodes and/or cathodes. It is preferable that a cross-sectional area of the frame has a channel density of at least 10 per in$^2$, more preferably at least 20 per in$^2$, and most preferably at least 100 per in$^2$. It is preferable that channel wall thickness is 50 mils or less, more preferably 30, most preferably 20 or less. It is preferable that the frame 50 include at least 20 channels.

The fuel cell device may further include a second electrolyte sheet attached to the frame, where the second electrolyte sheet also supports a plurality of cathodes and anodes situated on opposing sides of this second electrolyte sheet. The two electrolyte sheets are oriented such that either (i) anodes situated on the first electrolyte sheet face anodes situated on the second electrolyte sheet, or (ii) cathodes situated on the first electrolyte sheet face cathodes situated on the second electrolyte sheet, to enable reactant flow through the frame and between the electrolyte sheets.

Figure 1:
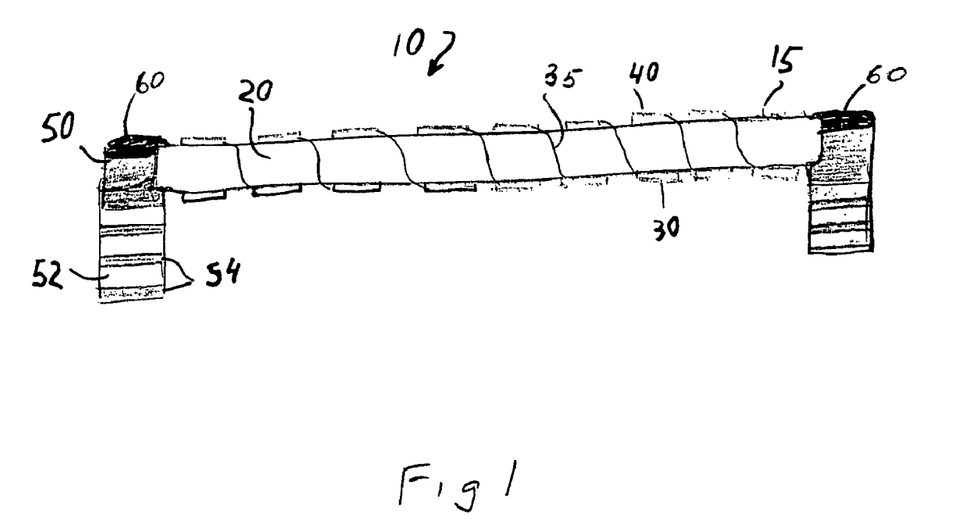
FIG. 1 is a schematic illustration of a cross-sectional view of one embodiment of the present invention.
Figure 2A:
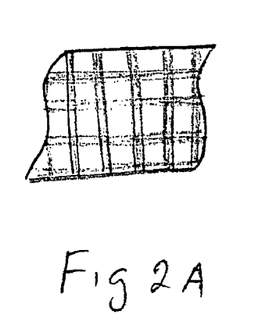
FIGS. 2A-2C are cross-sectional schematic views the portions of different frames for supporting fuel cell arrays, such as that illustrated in FIG. 1.
Figure 2B:
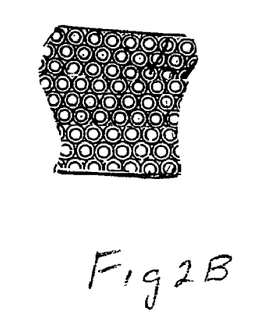
Figure 2C:
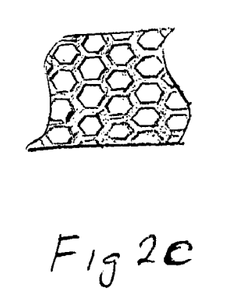

One embodiment of the present invention is shown in FIG. 1, and is designated generally throughout by the reference numeral 10. In accordance with this embodiment of the present invention the fuel cell device assembly 10 includes: (i) at least one fuel cell array 15 including an electrolyte sheet 20; a plurality of cathodes 30 disposed on one side of the electrolyte sheet 20 and a plurality of anodes 40 disposed on another side of the electrolyte sheet 20; and (ii) a frame 50 supporting the electrolyte sheet 20. The anodes 40 and cathodes 30 are interconnected by via interconnects 35 that extend through via holes in the electrolyte sheets The frame 50 has a plurality of channels 52 surrounded by solid walls 54. The frame 50 is preferably a honeycomb frame. That is, it has a "cellular" structure with high strength-to-weight ratio due to thin cellular walls, and the cell's cross-sections are preferably hexagonal, rectangular, square, or circular. FIGS. 2A-2C Illustrate some of the frame cell geometries. The cross-sections are shown normal to the cross-section of the frame 50 illustrated in FIG. 1. It is preferable that the frame 50 have a honeycomb structure. It is also preferable that the frame 50 have CTE close to that of electrolyte sheet 20, in order to provide expansion, comparable to that of the electrolyte sheet 20. If the electrolyte sheet 20 is made of partially stabilized zirconia (e.g., 3YSZ), it is preferable that the frame 50 has CTE (CTE=$\Delta L/L\Delta T$) of about 9 to 13 ppm/° C. and preferably 10 to 12 ppm/° C. Such CTE's may be realized for example, with ceramic compositions within the magnesia (MgO)—spinel (MgAl$_2$O$_4$) system.

Making the frame 50 with multiple channels 52 provides the advantage of having a multiple channels for reactant flow, while reducing the frame density and increasing the surface area due to its high OFA (open frontal area). The term "open frontal area" refers to the geometric fraction of the cross-sectional area of the frame 50 that is not filled by the solid materials (walls). It is preferable that OFA be higher than 0.4 and even more preferable that OFA be higher than 0.5. It is preferable that the geometrical wall surface area (GSA) of the frame 50 be higher than 5, more preferably higher than 10 and most preferable that GSA be between 15 and 100. Table 1 provides some examples of honeycomb frame geometries. In this table, the ratio $\rho_{hc}/\rho_{solid}$ denotes the ratio of "apparent" or effective honeycomb frame density relative to the density of the frame if it was made only from the solid material. For example, Table 1 shows that the frame 50 with cell density of 900 per in$^2$ and the wall thickness of 2 mils (0.05 mm) will be only 0.12 as dense as if it was made of the same solid materials, while having a large geometrical surface area GSA of 44.4 and OFA of 0.88.

TABLE 1

| Cell density (cells/in$^2$) | Wall Thickness (mils) | Wall Thickness (mm) | OFA | $\rho_{hc}/\rho_{solid}$ | GSA (cm$^2$/cm$^3$) |
|---|---|---|---|---|---|
| 200 | 16 | 0.41 | 0.55 | 0.45 | 17.2 |
| 400 | 8 | 0.3 | 0.68 | 0.32 | 26.5 |
| 400 | 6 | 0.15 | 0.76 | 0.24 | 27.7 |
| 400 | 4 | 0.10 | 0.84 | 0.16 | 29.0 |
| 600 | 4 | 0.10 | 0.80 | 0.20 | 34.8 |
| 900 | 2 | 0.05 | 0.88 | 0.12 | 44.4 |

As can be seen from the examples depicted in Table 1, the cross-sectional area of the frame 50 has channel (cell) density of at least 20 cells/in$^2$. It is preferable that the channel density be at least 50 cells/in$^2$, and most preferably at least 100 cells/in$^2$ and channel wall thickness be 20 mils or less. One advantage of the frame 50 is that because of the thin channel walls and/or high GSA relative to the frame made of only solid material, frame 50 has low thermal mass relative to a similar frame made from a solid material and thus can withstand faster thermal cycling rates than a similar frame made of only solid material. Furthermore, the channels 52 may be utilized to facilitate heat exchange within the frame 50. Finally, because frame 50 has a large surface area, the channel surfaces may be utilized for efficient catalyst dispersion.

It is preferable that frame 50 be ceramic. For ceramic materials, under conditions of low Blot modulus, the thermoplastic result (realistic heat transfer rates) for maximum stress is:

$$\sigma = (\alpha E \Delta T h l)/\{k(1-\mu)\}$$

where $\alpha$ is the thermal expansion coefficient, E is Young's modulus, $\Delta T$ the surface temperature change, h the heat transfer rate, l a characteristic dimension, k thermal conductivity, and $\mu$ Poisson's ratio. The maximum stress is directly proportional to characteristic dimension l. Considering the case where a gas flows uniformly through the channels 52 of the honeycomb frame 50 and the temperature and rate of gas flow determine the heat transfer rate to/from the walls of the honeycomb structure, the characteristic dimension is the wall thickness. For a solid frame under similar conditions, the characteristic dimension is the width or height of the frame, which is expected to be several millimeters or centimeters wide (high). Comparing the wall thickness of common honeycomb geometries (listed in Table 1) indicates that the frames 50 with the honeycomb structure will have the stress reduced (compared to a solid frame) by approximately one to two orders of magnitude due to the significantly thinner heated dimensions (channel walls).

A sealant 60 bonds the electrolyte sheet 20 to the frame 50. It is preferable that the sealant 60 be a hermetic sealant, for example a frit glass seal or a metal braze. Other hermetic sealants may also be used. The frame 50 may also contain exhaust openings 85, 85' where it is collected for additional thermal management and/or fuel recycling

EXAMPLES

The invention will be further clarified by the following examples.

Example 1

Figure 3A:
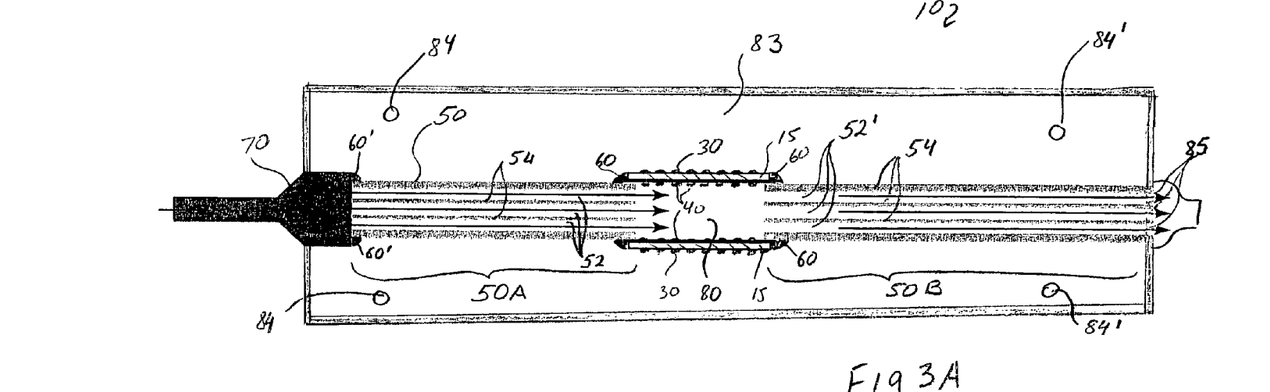
FIG. 3A is a cross sectional schematic view of a honeycomb frame and two fuel cell arrays bonded thereon.
Figure 3B:
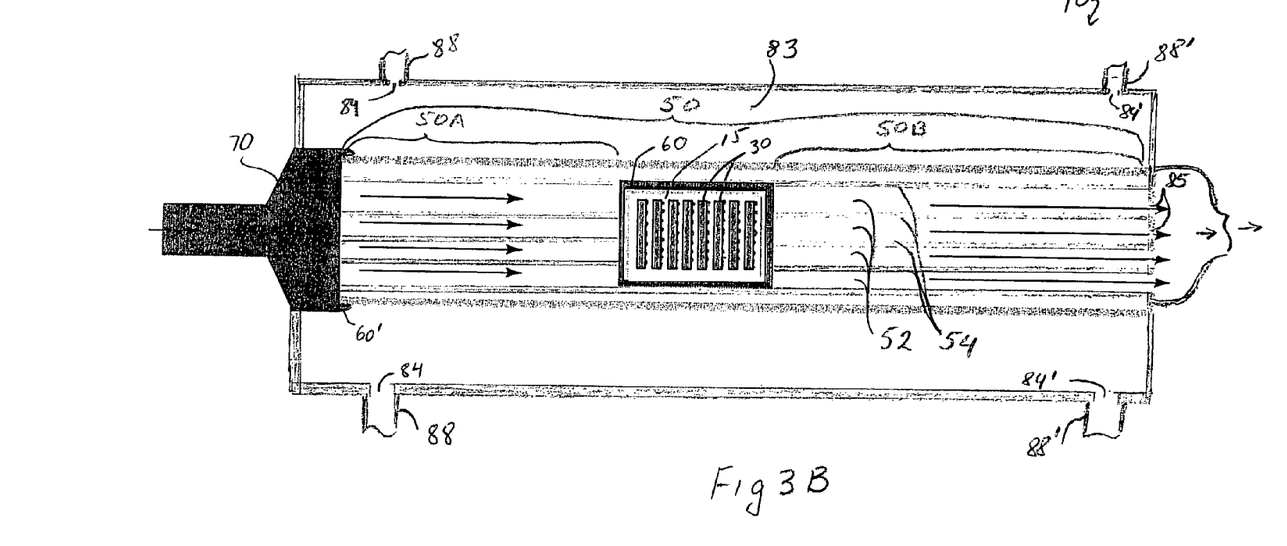
FIG. 3B illustrates schematically a planar view of the honeycomb frame and the fuel cell arrays shown in FIG. 3A.

One exemplary fuel cell device assembly according to the present invention is illustrated schematically in FIGS. 3A and 3B. FIG. 3A is a schematic cross-sectional view of an exemplary fuel cell device assembly 10. FIG. 3B is a schematic illustration of the top (planar) view of fuel cell device assembly illustrated in FIG. 3A. The direction of reactant (e.g., fuel) flow within the fuel cell device assembly is indicated by the arrows.

As shown in these figures, a fuel cell array assembly 10 comprises one fuel cell module 12. The fuel cell module 12 includes the frame 50 that supports two parallel fuel cell arrays 15, oriented such that the two sets of electrodes (e.g., anodes 40) face one another, forming a reactant (e.g., anode) chamber 80 therebetween. The frame 50 is bonded to the fuel cell arrays 15 by sealant 60. Fuel, for use with the fuel cell device assembly 10, is fed towards the frame 50, for example, through a gas distributing end piece 70 which is sealed to the frame 50 with a sealant 60'. The fuel passes (see direction of arrows) from the end piece 70, through the flow channels 52, to the anode chamber 80 formed by the two electrolyte sheets, into the exhaust flow channels 52', and is then exhausted via exhaust apertures 85. In this embodiment the exhaust apertures 85 are located on the section of the frame 50B situated furthest from the end piece 70 (exhaust side).

Thus, according to an embodiment of a present invention, a fuel cell device assembly 10 has a fuel cell stack that includes: (i) at least two fuel cell arrays 15, each fuel cell array 15 having a plurality of interconnected cathodes and anodes 30, 40 situated on opposite sides of an electrolyte sheet 20; and (ii) a frame 50 supporting the fuel cell arrays 15, such that the fuel cell arrays 15 are separated from one another and form at least one chamber (e.g., anode chamber 80) therebetween. The total number of chambers will depend on a total number of the fuel cells arrays 15 in a fuel cell stack. Thus, the fuel cell stack may include one or more modules 12. As defined herein, a fuel cell module 12 is two fuel cell arrays 15 bonded to the frame 50 and the associated electrical connector(s) between the two fuel cell arrays. The frame(s) 50 has a plurality of flow channels 52, to enable reactants (e.g. fuel) to flow through the frame(s) 50 and through the reactant chamber(s) 80 and/or 80'. In this embodiment, the fuel enters the anode chamber(s) 80 through the flow channels 52 and contacts anodes 40 of the fuel cell arrays 15. The exhaust fuel continues to flow through the exhaust flow channels 52 of frame 50, in the same direction, until it is collected from the exhaust openings 85. FIGS. 3A and 3B illustrate that flow channels 52 are situated in frame section 50A, while the exhaust flow channels 52' are situated in the frame section 50B. The fuel stack assembly is allayed in an air chamber 83, which contains air inlet aperture(s) 84 connected to the air inlet tube(s) 88 and air exhaust aperture(s) 84' connected to the air exhaust tube(s) 88'. The air chamber 83 provides air or oxygen to the cathodes 30 to enable operation of the fuel cells. This is shown schematically in FIGS. 3A and 3B.

Example 2

Figure 4A:
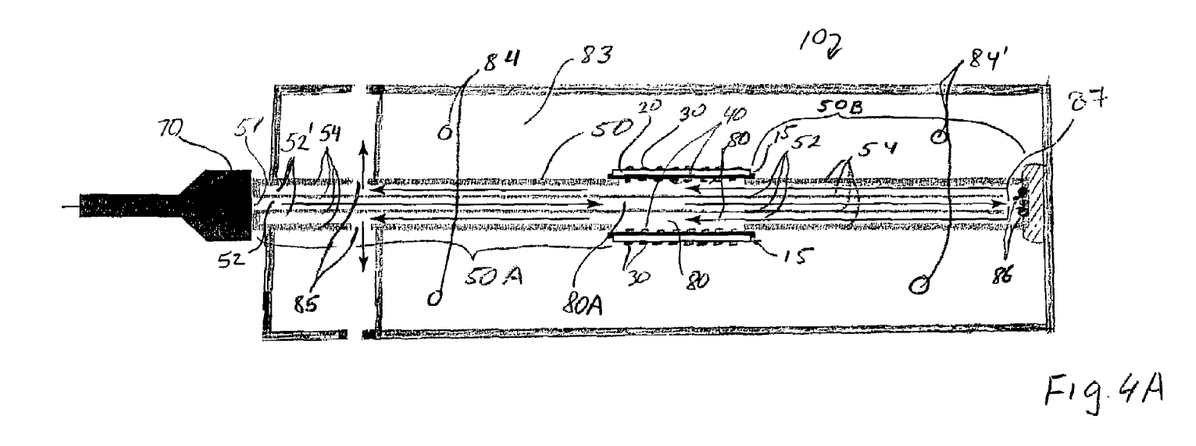
FIGS. 4A and 4B illustrate schematically a fuel cell module, including a honeycomb frame with internal heat exchange.
Figure 4B:
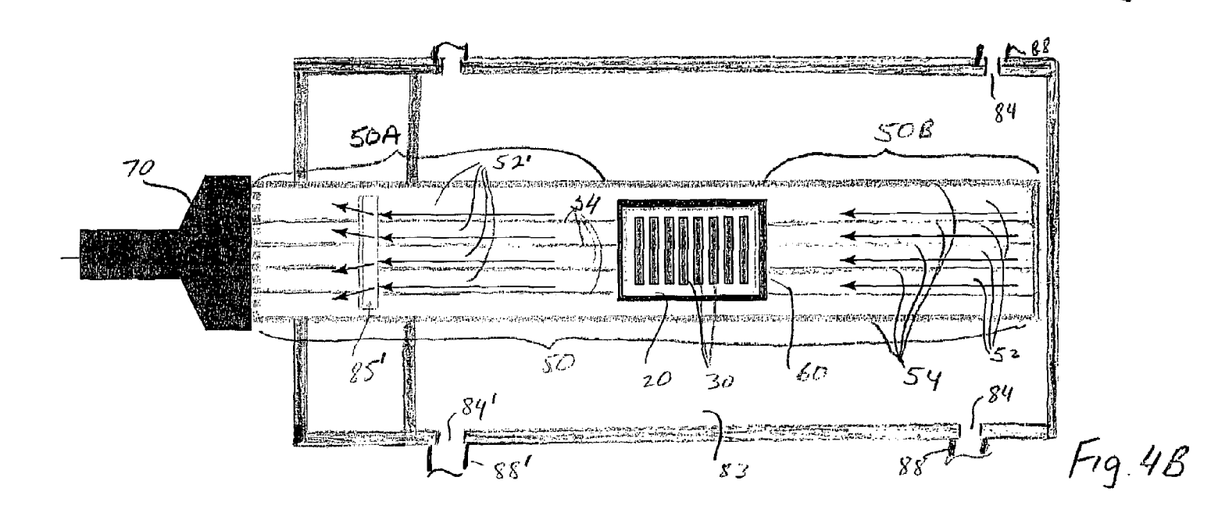

FIGS. 4A and 4B illustrate another embodiment of the present invention. FIG. 4A is a schematic cross-sectional view of the exemplary fuel cell device assembly providing heat exchange. FIG. 4B is a schematic illustration of the top (planar) view of the fuel cell device assembly illustrated in FIG. 4A.

In this embodiment the frame 50 is a heat exchanger. The frame 50 supports two parallel fuel cell arrays 15, oriented such that the two sets of anodes 40 face one another, forming anode chambers 80 therebetween. The anode chambers 80 are separated from one another by the heat exchange channel flow portion 80A of the central fuel flow channel(s) 52. According to this embodiment, the frame 50 includes at least one inlet opening 51 coupled to a fuel distribution end piece 70 and at least one exhaust outlet 85' located on the side of the frame attached to the fuel distribution end piece 70 (i.e. frame section 50A). At least one plug 86 prevents the fuel from exiting the central flow channel(s) 52 as it is done in the previous example. The fuel (as indicated by arrows in FIG. 4A) moves through the central flow channel(s) 52 and enters the heat exchange flow channel portion 80A. While moving through the heat exchange flow channel portion 80A the gas fuel is heated, via heat exchange (through channel walls 54) with the anode chambers 80. The heated gas fuel continues to flow through the central flow channel(s) 52 and is redirected via turnaround apertures 87 to the peripheral fuel flow channels 52 (section 50B of the frame) from which it enters into the anode chambers 80 where it is distributed across the anodes 40. That is, fuel gas exits (central) fuel flow channels 52 through the aperture(s) 87 in the channel wall(s) 54 and flows counter to its previous direction inside the peripheral channels 52, from which it enters the anode chambers 80. The gas fuel heats as it moves across the anodes 40 in the anode chamber 80 and the hot exhaust fuel enters the exhaust fuel channel(s) 52' (section 50A of the frame). Thus, in this embodiment the initial fuel flow moves in reverse direction to the exhaust fuel flow. As stated above, when the fuel moves across the electrodes of each cell, it gets hotter and hotter. It is significantly hotter when it re-enters section 50A of the frame, than it was when it entered the frame section 50A through the fuel inlet 51. The hot exhaust fuel enters the exhaust flow channels 52' and moves counter to the fuel flow within central channels 52. The direction of fuel through the peripheral channels 52, 52' is illustrated schematically by arrows in FIG. 4B. When the hot exhaust fuel enters section 50A of the frame 50, heat is transferred from channels 52' to the central channels 52 through the walls 54, thereby cooling down the exhaust flow channels 52' and heating the incoming fuel. Thus, the frame 50 of this embodiment acts as a heat exchanger. The frame 50 shown in FIG. 4A-4B includes a plurality of fuel flow channels 52 and a plurality of separate exhaust fuel flow channels 52', both situated in frame sections 50A.

As in a previous example, the fuel cell stack assembly is allayed in the air chamber 83, which contains air inlet aperture(s) 84 connected to the air inlet tube(s) 88 and air exhaust aperture(s) 84' connected to the air exhaust tube(s) 88'. The air chamber 83 provides air or oxygen to the cathodes 30 to enable operation of the fuel cells. The air chamber 83 is shown schematically in FIGS. 4A and 4B.

Example 3

Figure 5A:
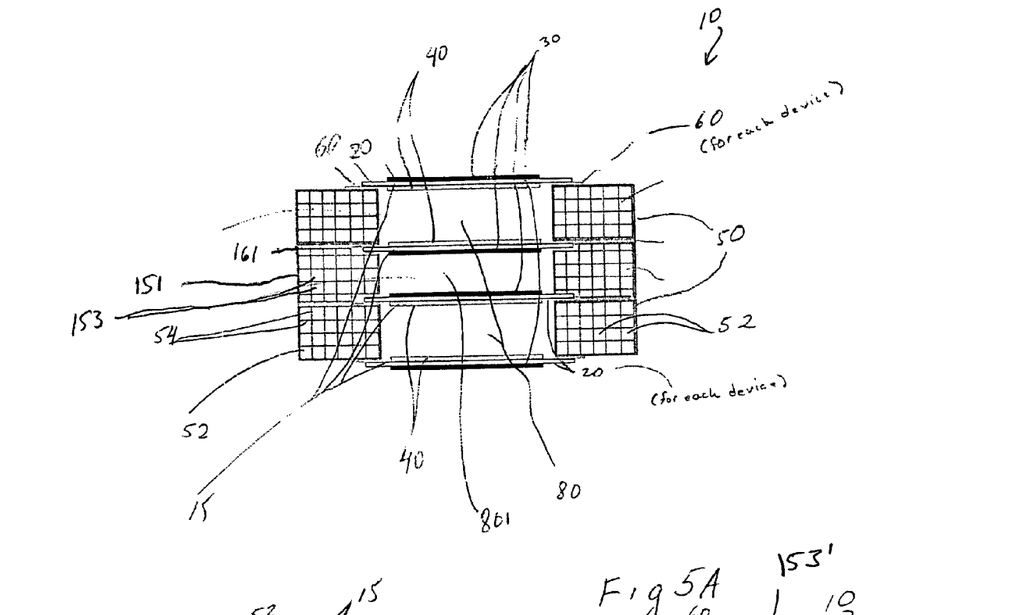
FIGS. 5A and 5B illustrate schematically a fuel cell device assembly comprising a fuel cell stack with joined honeycomb frames.
Figure 5B:
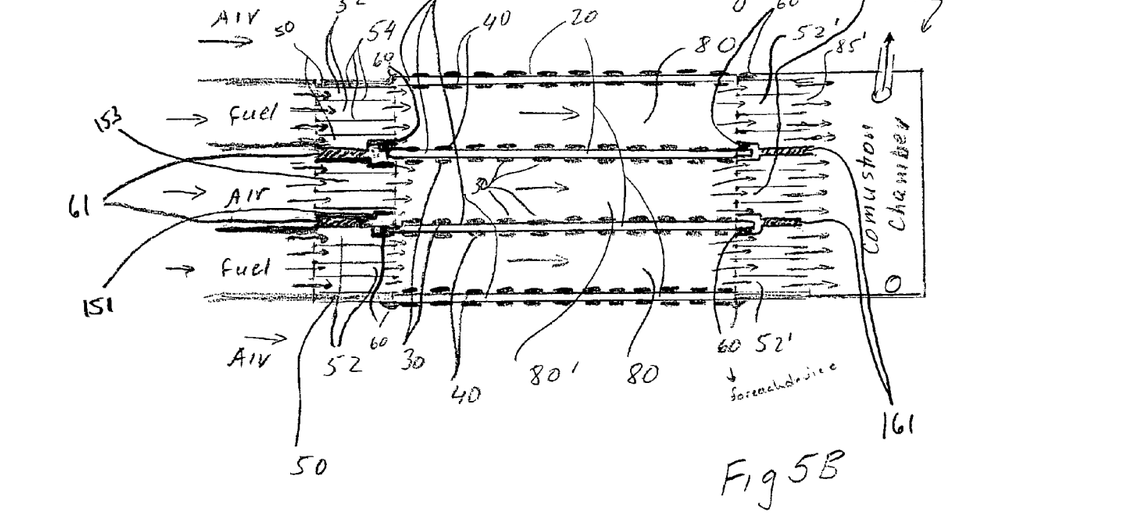

As shown in FIGS. 5A and 5B, the fuel cell stack may include three or more fuel cell arrays 15 supported by the frame(s) 50, such that (i) anode sides of at least two of the fuel cell arrays 15 face each other, thereby forming an anode chamber 80 and (ii) cathode sides of at least two of the fuel cell arrays 15 also face one another, thereby forming a cathode chamber 80'. As shown in FIG. 5B, frames 50 have a plurality of parallel channels 52 providing (a) fuel gas to the anode chamber 80 and (b) oxygen flow to the cathode chamber 80'. The frames 50 also have a plurality of channels 52' for the exhaust gases to exit the cathode/anode chambers 80', 80. As described in the prior examples, the fuel cell arrays 15 are bonded to the frames 50 with a sealant 60. A "packet" type fuel cell stack is formed by utilizing frame(s) 50 and multiple fuel cell arrays to form reactant chambers (packets) therebetween.

Thus, as shown in FIGS. 5A and 5B, an exemplary fuel cell device assembly 10 includes: (I) a plurality of electrically interconnected fuel cell arrays 15, each including: an electrolyte sheet 20; a set of electrodes, the first set of electrodes being a plurality of cathodes 30 disposed on one side of the electrolyte sheet 20; a second set of electrodes, the second set of electrodes being a plurality of anodes 40 disposed on another side of the electrolyte sheet 20; and (II) frames 50 supporting and attached to the electrolyte sheets 20, the frame 50 having a plurality of parallel channels 52 for providing a reactant to at least one set of the electrodes. A frame 51 separates the frames 50 which are banded to electrolyte sheet 20. Frame 151 may be sealed to frames 50 with seal 161. It is preferable that the frame cross-sectional area of the frame 50 has channel density of at least 10 channels/in$^2$ and preferably at least 50 channels/in$^2$ and channel wall thickness of 20 mils or less. It is most preferable that the channel density be at least 100 channels/in$^2$. The plurality of the electrolyte sheets 20 are oriented such that (i) anodes 40 situated on the one of the electrolyte sheets face anodes 40 situated on another one of the electrolyte sheets, to enable reactant flow through the frames 50 and between the fuel cell arrays 15; and (ii) cathodes 30 situated on one of the electrolyte sheets face cathodes 30 situated on the yet another one of the electrolyte sheets, thus forming an oxygen (cathode) chamber 80'. Preferably the air or oxygen gas flows through the frame(s) 151, via channels 153, into the oxygen chamber, comes into contact with the cathodes and then flows through the frame(s) 151, via channels 153' and out of the frame's exhaust apertures 85. In this embodiment, the exhausted fuel and air are provided to the combustion chamber 91 where the exhausted fuel burns. The resultant heat from the combustion chamber is provided, as needed, to the fuel cell device assembly to enable a more efficient operation.

Example 4

Figure 6A:
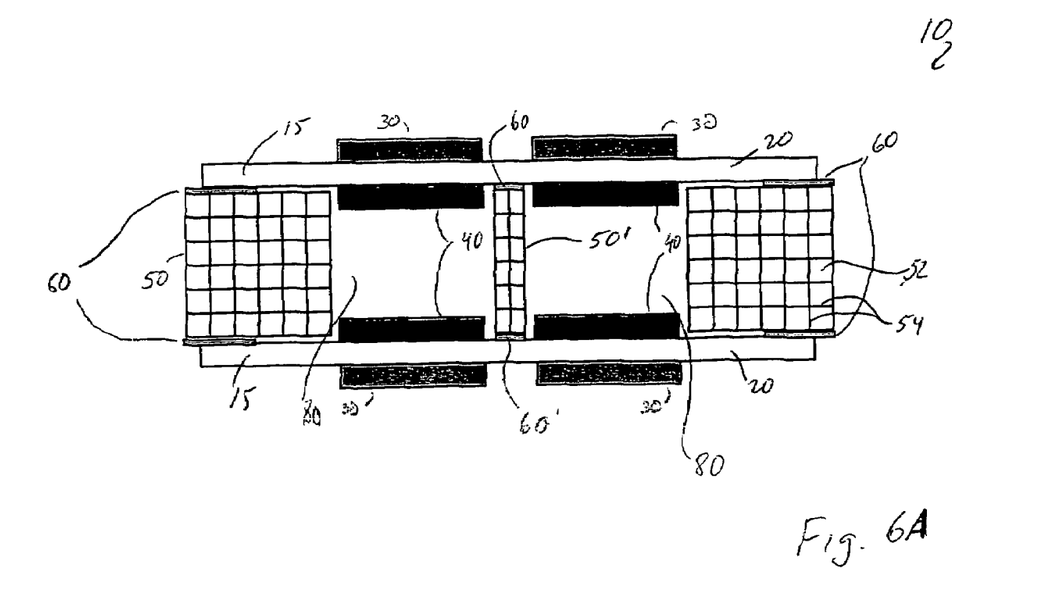
FIGS. 6A and 6B illustrate schematically a fuel cell device assembly that includes a honeycomb frame that has additional cross support surfaces.
Figure 6B:
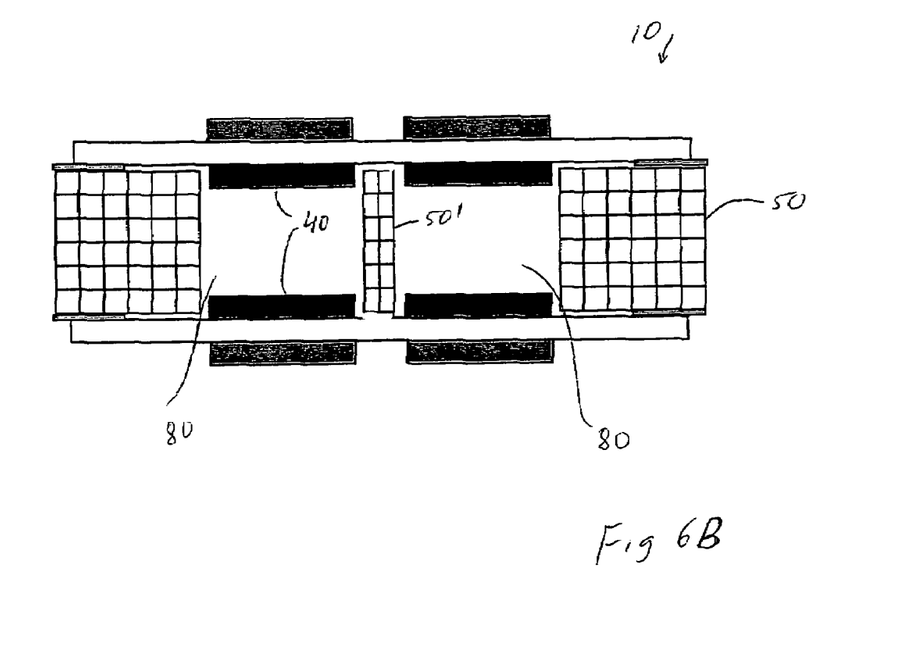

A number of variations or modifications to the basic honeycomb frame concept described above can be made to implement different stack configurations. One such variation includes frame 50 that includes periodic support structure(s) 50', which provide additional surfaces for support of the planar fuel cell arrays 15. As shown in FIG. 6A, the fuel cell device assembly 10 may include more than one column of the fuel cell arrays 15. The fuel cell arrays 15 are bonded to the frame 50 at outer edges, as well as to the support structure(s) 50', with sealant 60. The fuel cell arrays 15 are situated such that the anodes 40 face the internal anode chamber 80. Alternatively, it is sometimes desirable to allow fuel cell arrays flexural freedom, but to limit deflection. One means of limiting deflection but allowing flexural deformation fuel cell arrays 15 is to provide a frame 50 and support structure(s) 50', as illustrated in FIG. 6A, but to eliminate the sealant 60 joining the fuel cell array 15 to the support structure 50'. This is shown in FIG. 6B.

Example 5

Figure 7A:
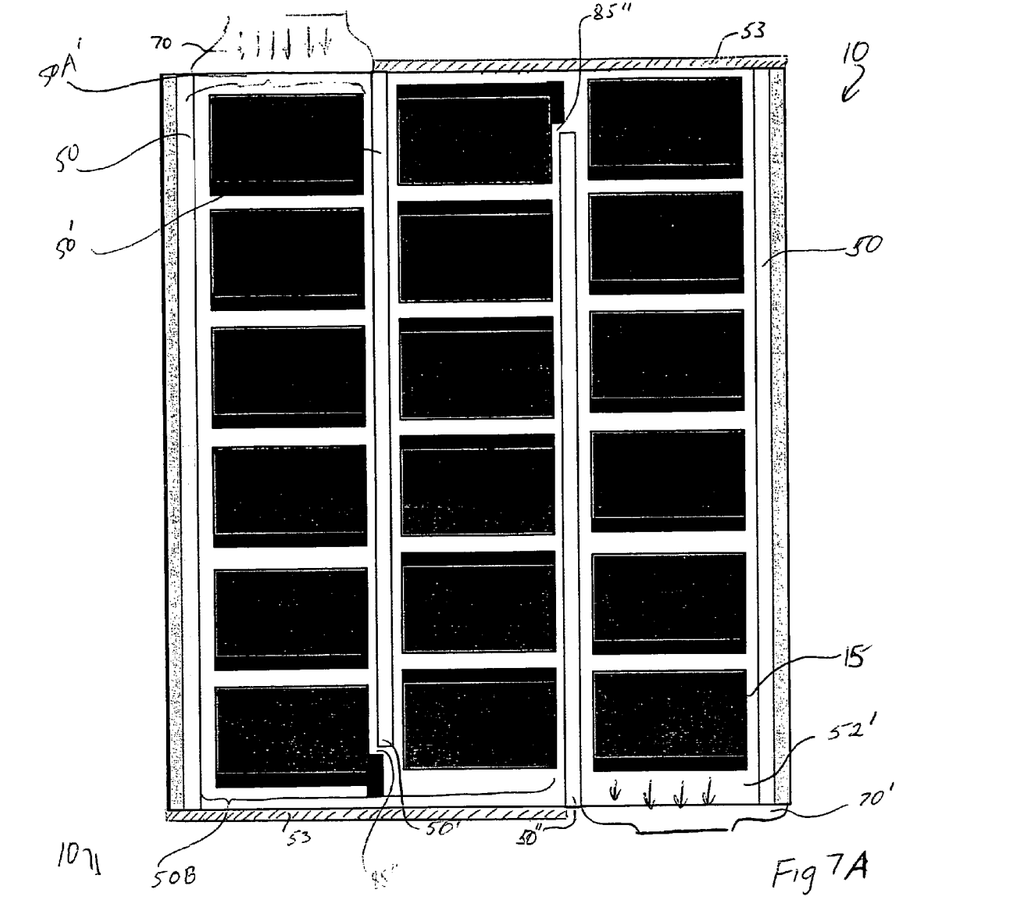
FIGS. 7A and 7B illustrate schematically a fuel cell device assembly that includes a honeycomb frame with reciprocating gas flow.
Figure 7B:
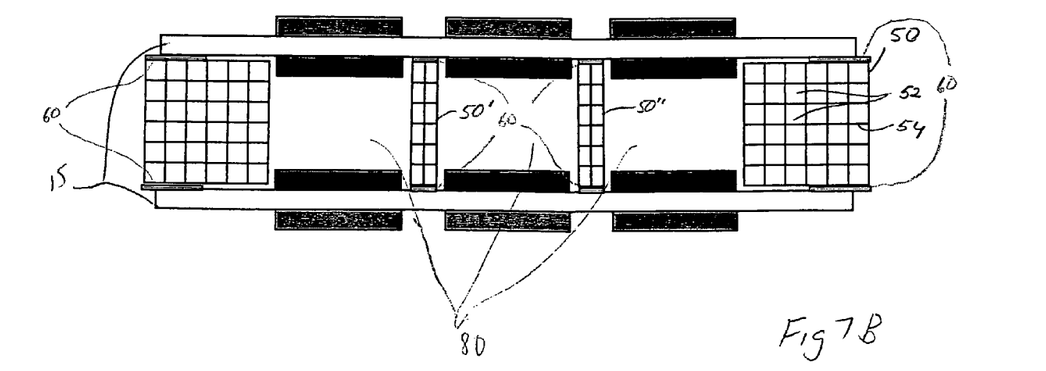

The support structures 50' may also provide a gas distribution function. FIGS. 7A and 7B illustrate schematically a fuel cell device assembly 10 that utilizes frame 50 for reciprocating distribution of the fuel flow. Such frames 50 advantageously achieve greater fuel utilization and greater thermal uniformity. Frame 50 has a honeycomb structure and includes support structures 50' and 50" situated within the anode chamber 80. Some of the honeycomb channels 52 of the frame section 50A are plugged near the fuel inlet end with a plug 53, thereby directing inlet fuel through channels in part 50A' of the section 50A. The part 50A' of the section 50A is located between one edge of the frame 50 and the edge of support structure 50'. Similarly near the fuel exhaust end, frame section 50B is plugged with a plug 53, restricting fuel exhaust to only some of the channels 52'. The support structures 50' and 50" have openings 85" with respect to the perimeter portion of the frame 50 which guide the fuel gas flow in a reciprocating fashion (as shown by arrows) until it exits into exhaust intake 70'. The serpentine movement of the fuel gas across the electrodes provides a longer path length for the fuel and thus achieves better fuel utilization as well as greater thermal uniformity across the fuel cell arrays 15.

Example 6

Figure 8A:
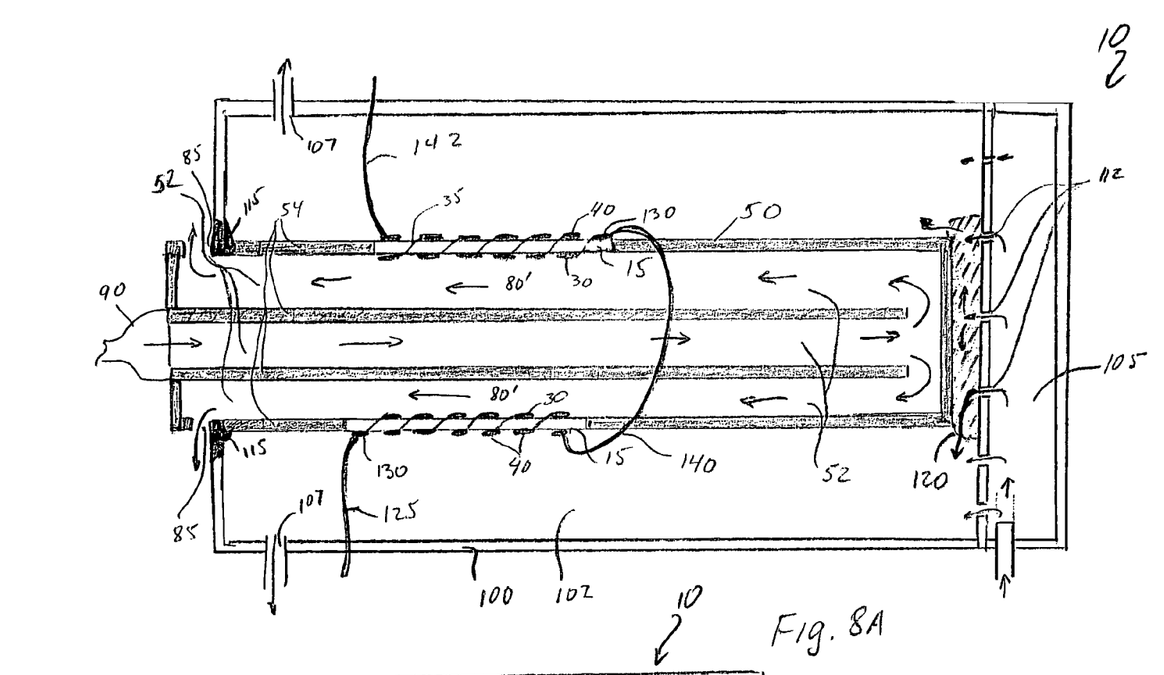
FIGS. 8A and 8B is a schematic illustration of another embodiment of the fuel cell device assembly that includes a honeycomb frame.
Figure 8B:
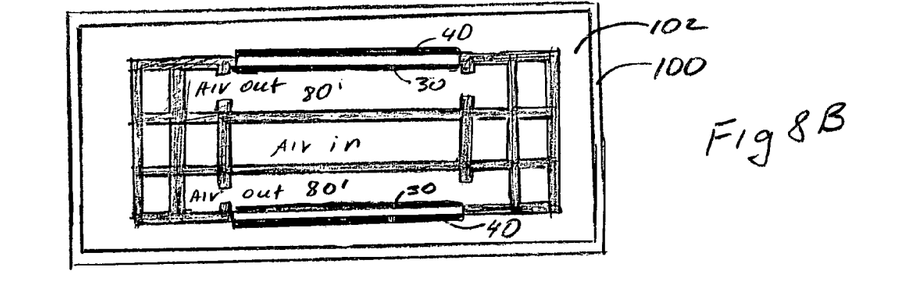

The ability to separate manufacturing of the fuel cell arrays 15 from the manufacturing of the frame 50 enables greater design flexibility. For example, because manufacturing of the frame and the manufacturing of the fuel cell array are two separate processes, different orientations of the electrodes with respect to the frame cavity are now possible. One embodiment of the present invention is illustrated in FIGS. 8A and 8B. In this embodiment the fuel cell arrays 15 are bonded to frame 50 with the cathode side facing the interior of the frame 50. In this cathode-facing-cathode arrangement, air is supplied through the parallel channels 52 of the honeycomb frame 50 to the interior cathode chambers 80' while fuel for the anodes is supplied outside of these chambers, on the anode facing sides of the fuel cell arrays 15. More specifically, air is fed through the air inlet 90 and enters the fuel cell air inlet central channels 52. A turnaround at or near the end of the fuel cell air inlet channels 52, distributes air from the air inlet channels to the peripheral channels 52 which supply air to the cathodes 30. The exhausted air is directed out through the air exhaust aperture 85.

FIGS. 8A and 8B illustrate that the housing 100 forms the fuel distribution chamber 102. The Frame 50 and the fuel cell arrays 15 bonded thereto are situated inside chamber 102, such that fuel is in contact with the anodes 40 of the fuel cell arrays 15. The housing 100 has at least one, and preferably a plurality of fuel gas inlets 112 which are connected to the fuel distributor 105. Fuel is exhausted from the chamber 102 through one or more fuel gas exhaust aperture 107 situated in the housing 100. The exhausted fuel and air may be combined in a combustion chamber to generate heat, which can then be utilized by the fuel stack to warm up the incoming fuel to the desired temperature. The fuel cell device assembly 10 illustrated in FIGS. 8A and 8B has an advantage of improved thermo-mechanical durability because the frame 50 and the attached fuel cell arrays 15 (i.e., fuel cell modules) are mechanically fixed to the housing 100 by a seal 115 only at one end of the module. As illustrated in these figures, the frame 50 and the attached fuel cell arrays 15 are supported by the inlet side seal 115 between the housing 100 and the modules 12.

However, in an alternative arrangement, the frame 50 and the attached fuel cell arrays 15 may rest on a compliant support 120 (shown schematically in FIG. 8A by dashed lines). The compliant support 120 may be, for example, metal foam situated inside the chamber 102.

Since the frame 50 and the attached fuel cell array(s) 15 are not held in a fixed position near the opposite end (the air turnaround) of the housing 100, excessive strain from thermal gradients across the length of the module are either minimized or avoided altogether. A first electrical connection 125 to the first fuel cell array 15 may be made with a solid conductor such as Ni or Ag wire or Ni or Ag ribbon attached to the cathode contact 130. The anode contact pad 130 is made, foe example, of silver-palladium alloy (silver-palladium cermet). The anode contact pad 130 is connected through a via interconnect to a first cathode 30. A second electrical connection, between the two fuel cell arrays 15 shown in these figures, may also include solid conductor 140 such as Ag or Ni wire or Ag or Ni ribbon attached to the anode 40 portion of the first array and the cathode contact 130 of the second array 15, routed along the periphery of the frame 50. A third electrical connection 142, to the second fuel cell array 15, may include solid conductor such as Ag or Ni wire or Ag or Ni ribbon attached to the last anode 40 of the second fuel cell array 15. The first and third electrical connections 125, 142 may then be extended through the housing 100 to enable wiring of multiple devices 10 and power extraction.

Example 7

Figure 9:
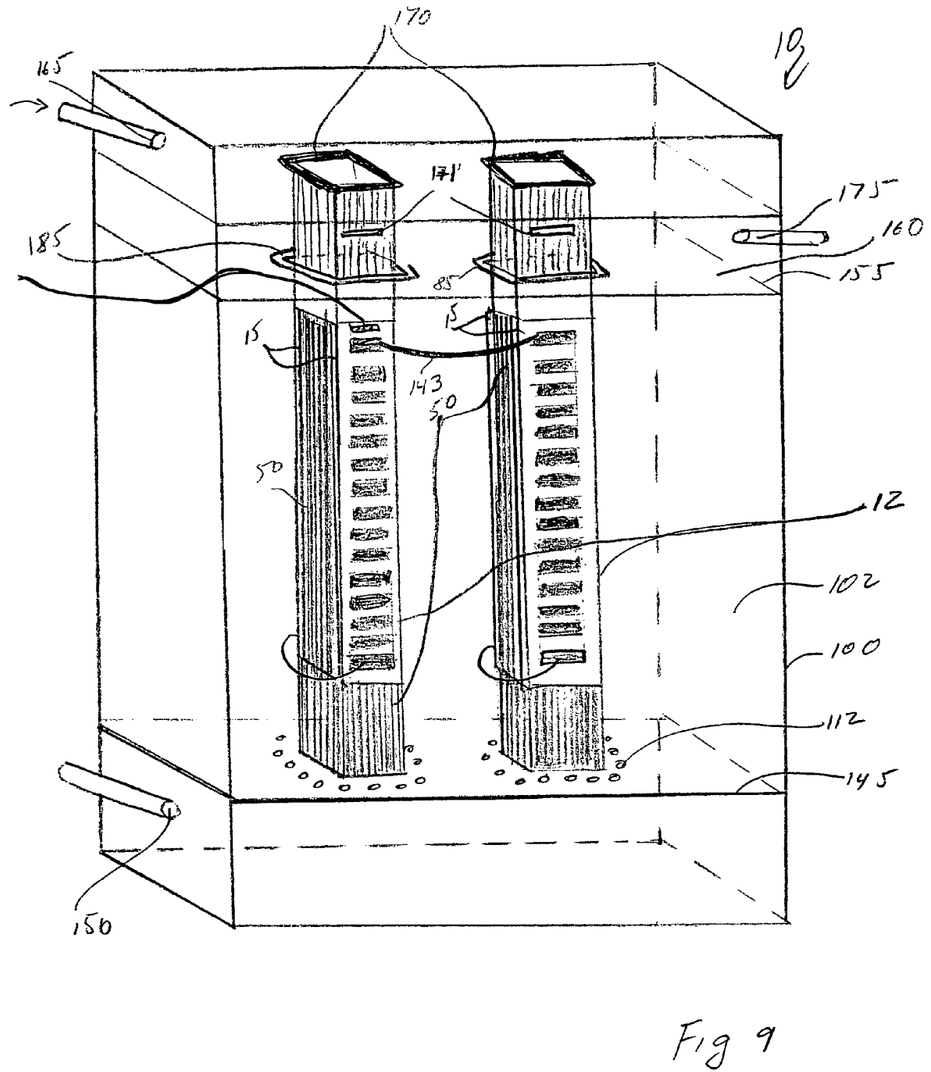
FIG. 9 is a schematic illustration of the fuel cell device assembly that includes two fuel cell modules.

FIG. 9 illustrates schematically another embodiment of the fuel cell device assembly 10. This embodiment is similar to that illustrated in FIGS. 8A and 8B, but includes two fuel cell modules 12 (i.e. two sets of frames 50, with each frame supporting two fuel cell arrays 15). This arrangement has the advantage multiple modules can share a common housing 100, which provides a compact design with good fuel utilization. Module to module electrical interconnection 143 can be provided by an inexpensive base metal such as a nickel screen, felt or mesh because this interconnection is situated in the fuel chamber, and not in the oxidizing environment. Any number of the interconnected modules may be placed in the gas distribution chamber 102, as needed. More specifically, FIG. 9 illustrates that two fuel cell modules 12 (each with two multicell planar fuel cell arrays 15 bonded to either side of the frame 50) are situated inside a gas distribution chamber 102 formed by the housing 100. The housing 100 contains a fuel distribution plate 145 and has through holes 112 which allow for distribution of the fuel that enters fuel cell assembly 10 through the fuel inlet 150. Fuel is exhausted through a narrow slit 185 in plate 155 of the housing 100 and enters from the chamber 102 into combustion chamber 160. Plate 155 separates the combustion chamber 160 from the fuel chamber 102. Air is fed through inlet 165 and enters the fuel cell modules 12 through flow channels 52 of the frame(s) 50. A seal 171 reduces fresh air incursion into the combustion chamber 160. The air distribution geometry, though not illustrated here, is similar to that illustrated in FIGS. 8A and 8B. A turnaround at the bottom end of the honeycomb distributes the air from interior inlet channels of the honeycomb to perimeter channels which supply the cells. Ultimately air is exhausted through exhaust slits 170. The exhausted air mixes with exhausted fuel, providing a combustion product exhausted through the combustion exhaust 175.

Electrical interconnection 143 between the two fuel cells modules 12 is provided, for example, by a compliant nickel felt, which is bonded to the cathode contact 130, in a manner similar to that of the third electrical connection 142 illustrated in FIG. 8A, and to the top anode 40 of the adjacent module 15. Electrical contact between two fuel cell arrays 15 of each fuel cell module 12 can be provided in a manner similar to that illustrated in FIG. 8A.

Other Advantages Provided by the Frame

The high geometric surface area provided by the walls of the honeycomb frame 50 is beneficial for distributing fuel reforming catalyst material (for example, Ni metal or noble metals) for converting hydrocarbon (gas) fuel into a hydrogen rich gas stream. This provides excellent access of the reactant gas to the catalyst material at low backpressure (i.e., low pressure drop between inlet aperture pressure and the exhaust aperture pressure), for example, below 1 PSI. Therefore, it is advantageous to integrate catalytic functionality within the honeycomb frame 50. For solid oxide fuel cells (SOFC) illustrated, for example those illustrated in the above described figures, channels 52 in the frame section(s) 50A, situated upstream from the anode chamber 80, may be catalyzed to provide fuel reformation. Catalyzation of the channel walls 54 may be achieved by wash coating (for example, by wash coating, via immersion of the porous portions of the channel walls 54 of the frame 50 in a slurry of high-surface area ceramic particles (e.g. high surface area alumina) with noble metal catalysts carried on the surfaces of the ceramic particles). In order to provide catalytic oxidation, noble metal catalysts may be deposited (for example, by wash coating as described above, onto the channel walls 54 in the porous portions of frame 50) at the exhaust end of the frame 50. This will enable lean spent fuel/oxidant mixtures to efficiently combust and improve heat exchange efficiency. The resultant heat may be utilized, for example, to heat (via heat exchanger) the incoming gas fuel to the operating temperature required by the fuel cells (e.g., about 700° C.), to provide more efficient operation of the fuel cell stack assembly.

In certain situations the channel walls 54 may be too dense (not porous enough) for effective wash coating. In this case, the catalyst may be incorporated into the wall 54 by inclusion in the forming process. For example, Ni reforming catalyst may be included by adding NiO into the frame precursor materials. The NiO will, on reduction by the fuel gas, form distributed Ni fuel reformation catalyst at the surface of the flow channels 52. Preferably, the NiO component should be less than 30 volume percent of the inorganic material to avoid loss of structural integrity in the finished frame. More preferably the NiO component should be 10% or less. As stated above, for certain applications (including, but not limited to combined cycle systems), it may be beneficial to catalyze the channel walls 54 in the frame section 50B, located near the exhaust apertures 85, with an oxidation catalyst by including the noble metal(s) into frame forming materials, which on reduction will form distributed noble metal oxidation catalyst at the surface of the flow channels 52. This will enable the fuel cell assembly to efficiently utilize unreacted fuel to produce thermal energy.

The flow channels 52, 52' may also be used as insulating conduits for lead wires, or sensor (e.g. thermocouple) wires. Some of the channels 52, 52' may be dedicated for running leads and/or sensor wires to various locations on the planar array fuel cell. The channels provide a low cost alternative for containing and supporting wires which require insulation.

The "self-contained" nature of a honeycomb/planar fuel cell array assembly enables other beneficial design approaches. Since "long" honeycomb frames may be easily manufactured, different sections of the frame 50 may be maintained at different temperatures. One may wish, for example, to maintain the inlet to the frame 50 at low temperature—enabling the use of a low-temperature polymer seal 60 between the inlet manifold and the frame 50

As embodied herein and depicted in FIGS. 1-9 frame 50 may be made of 3YSZ and may be manufactured, for example, by utilizing the extrusion process according to the following steps:

1. An extrusion batch of 3YSZ with 3% by weight methylcellulose as the binder is mixed with water to a consistency appropriate for extrusion.
2. The batch is ram extruded through die, for example a 200 cell per square in die with 16 mil spacing between the pins. A rectangular mask is placed in front of the die to form a "200/16" green extrudate comprising a rectangular array of channels with four horizontal "rows" and seventeen vertical "columns."
3. Parts are cut to just over 32" in the green state. In the middle of the part an opening 1.5" long and 0.75" wide (corresponding to 11 channels) is cut halfway through the extrudate (two channels deep) to create an anode chamber.
4. In order to seal a small number of defects in the exterior skin, the external surface is painted with a 3YSZ slip. Details of the exemplary 3YSZ slip composition and fabrication may be found in U.S. Pat. No. 6,623,881, incorporated by reference herein. Additionally, the YSZ slip is used to plug the bottom two rows of channels to provide an exhaust restriction to prevent air incursion into the anode chamber.
5. The green part is sintered at approximately 1450° C. After sintering for four hours, the green part shrinks linearly approximately 25% and has front face dimensions of ¼"× 1" and a length of 24". An aluminum metal end-piece which distributes the inlet gas from a ¼" stainless steel tube to the honeycomb channels was sealed to the extrudate tube using an organic epoxy.
6. A single cell test piece with LSM/YSZ cathode and a Ni/YSZ anode and Ag—Pd alloy current collectors is screen printed and fired on a 20 um thick 3YSZ electrolyte sheet with dimensions 1"×2". Via interconnects are used to allow the anode electrical lead contact to be made on the air side.
7. The test piece is sealed to the 3YSZ extrudate frame using a Ag—Pd alloy. Silver lead wires were bonded to Ag—Pd alloy contact pads contacting the cell using a Ag—Pd ink. Upon testing at 725° C. under hydrogen bubbled through water, open circuit voltage of just over 1V was measured—indicating minimal cross-over leakage.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A solid oxide fuel cell device assembly comprising: (i) at least one planar electrolyte sheet; (ii) a plurality of cathodes disposed on one side of the electrolyte sheet; (iii) a plurality of anodes disposed on another side of the electrolyte sheet; and (iv) at least one honeycomb-like frame, the frame supporting the electrolyte sheet and having a periodic array of plurality of parallel channels with openings to enable reactant to flow through the frame such that reactant contacts the cathodes and/or the anodes, and wherein (i) the length of said channels is longer than a width of said channels; and (ii) the ratio $\rho_{hc}/\rho_{solid}$ of effective honeycomb frame density relative to the density of the frame if it was made only from the solid material is $\rho_{hc}/\rho_{solid} <= 0.45$.

2. A fuel cell device assembly according to claim 1 comprising:
(i) at least two fuel cell arrays, each fuel cell array having a plurality of interconnected electrodes, including cathodes and anodes situated on opposite sides of the substantially planar electrolyte sheet; and
wherein the frame supports the fuel cell arrays such that the fuel cell arrays are separated from one another and form at least one chamber therebetween, said frame having a periodic array of plurality of parallel flow channels for reactant to flow through the frame, wherein (i) the length of said channels is longer than a width of said channels, and (ii) each of said channels ending in an opening for the reactant to flow through said chamber for contacting electrodes of each of said at least two fuel cell arrays.

3. The fuel cell device assembly according to claim 2 wherein said frame includes an at least one inlet opening coupled to a fuel distribution end piece and at least one exhaust outlet.

4. The fuel cell device assembly according to claim 2, wherein said fuel cell device assembly comprises at least four fuel cell arrays supported by said at least one frame, such that (i) cathodes of at least two of said four fuel cell arrays facing each other, thereby forming a cathode chamber and (ii) anodes of at least two of said four fuel cell arrays face one another, thereby forming an anode chamber.

5. The fuel cell device assembly according to claim 3, wherein said frame forms a plurality of parallel incoming fuel flow channels and a plurality of parallel exhaust fuel flow channels, and wherein at least some of said channels substantially extend through the length of said frame.

6. The fuel cell device assembly according to claim 5, wherein fuel supplied to anodes flows in counter direction from the exhaust fuel flow.

7. The fuel cell device assembly according to claim 5, wherein said at least one frame has a plurality of channels providing oxygen flow to the cathode chamber and a plurality of channels for exhaust gases to exit the cathode chamber.

8. The fuel cell device assembly according to claim 1, wherein said electrolyte sheet is sealed to said frame with a glass fit.

9. The fuel cell device assembly according to claim 1, wherein said frame includes additional support component.

10. The frame according to claim 9, said frame being a ceramic honeycomb frame.

11. A solid oxide fuel cell device assembly comprising: (i) at least one electrolyte sheet; (ii) a plurality of cathodes disposed on one side of the electrolyte sheet; (iii) a plurality of anodes disposed on another side of the electrolyte sheet; and (iv) at least one frame, the frame supporting the electrolyte sheet and having a periodic array of plurality of parallel channels with openings to enable reactant to flow through the frame such that reactant contacts the cathodes and/or the anodes, wherein a cross-sectional area of said frame has channel density of at least $10/in^2$ and channel wall thickness of 50 mils or less and the ratio $\rho_{hc}/\rho_{solid}$ of effective frame density relative to the density of the frame if it was made only from the solid material is $\rho_{hc}/\rho_{solid} <= 0.45$.

12. The fuel cell device assembly according to claim 11 wherein such that a cross-sectional area of said frame has channel density of at least $100/in^2$ and channel wall thickness of 50 mils or less, and at least some areas of said frame have geometrical surface area GSA of at least $17.2\ cm^2/cm^3$.

13. A fuel cell device assembly according to claim 11 wherein and said frame is attached to a first and a second electrolyte sheet, said frame having a cross-sectional area with channel density of at least $50/in^2$ and channel wall thickness of 20 mils or less.

14. The fuel cell device assembly of claim 13 wherein either (i) anodes situated on said first electrolyte sheet face anodes situated on said second electrolyte sheet, or (ii) cathodes situated on said first electrolyte sheet face cathodes situated on said second electrolyte sheet, such that reactant can flow through said frame and therebetween.

15. The fuel cell device assembly according to claim 14 wherein said frame is a ceramic frame having a geometric fraction of an area that is not solid of at least 0.5.

16. The fuel cell device assembly according to claim 13 wherein said frame has honeycomb structure.

17. The fuel cell device assembly according to claim 13, wherein said frame provides sufficient area for catalyst dispersion.

18. The fuel cell device according to claim 13, wherein at least some of said channels in said frame provide passways for exhaust.

19. The fuel cell device assembly according to claim 13 wherein at least some of said channels in said frame provide passways for heat exchange.

20. The fuel cell device assembly according to claim 13, wherein at least some of said channels in said frame provide passways for fuel.

21. The fuel cell device assembly according to claim 13, wherein said electrolyte sheets are sealed to said frame with a hermetic sealant.

* * * * *